(12) United States Patent
Schäfer et al.

(10) Patent No.: US 10,378,508 B2
(45) Date of Patent: Aug. 13, 2019

(54) BULKHEAD ASSEMBLY FOR A WIND TURBINE BLADE

(71) Applicant: LM WP PATENT HOLDING A/S, Kolding (DK)

(72) Inventors: Michael Schäfer, Kolding (DK); Lars Fuglsang Andersen, Odense S (DK)

(73) Assignee: LM WP PATENT HOLDING A/S, Kolding (DK)

( * ) Notice: Subject to any disclaimer, the term of this patent is extended or adjusted under 35 U.S.C. 154(b) by 314 days.

(21) Appl. No.: 15/118,281

(22) PCT Filed: Feb. 13, 2015

(86) PCT No.: PCT/EP2015/053071
§ 371 (c)(1),
(2) Date: Aug. 11, 2016

(87) PCT Pub. No.: WO2015/121408
PCT Pub. Date: Aug. 20, 2015

(65) Prior Publication Data
US 2016/0356263 A1 Dec. 8, 2016

(30) Foreign Application Priority Data
Feb. 14, 2014 (EP) .................................. 14155186

(51) Int. Cl.
*F03D 1/06* (2006.01)
(52) U.S. Cl.
CPC .......... *F03D 1/0675* (2013.01); *F03D 1/0658* (2013.01); *Y02E 10/721* (2013.01); *Y02P 70/523* (2015.11)

(58) Field of Classification Search
CPC .... F03D 1/0675; F03D 1/0658; Y02P 70/523; Y02E 10/721
See application file for complete search history.

(56) References Cited

U.S. PATENT DOCUMENTS 3,832,819 A * 9/1974 Houdin ................. E04B 1/3527
52/2.26
5,921,571 A * 7/1999 Bell .......................... B62B 7/06
280/204

(Continued)

FOREIGN PATENT DOCUMENTS

EP 2 497 941 A1 9/2012
EP 2 235 364 B1 10/2013
(Continued)

*Primary Examiner* — Richard A Edgar
(74) *Attorney, Agent, or Firm* — Nath, Goldberg & Meyer; Tanya E. Harkins; Jerald L. Meyer (57) ABSTRACT

A bulkhead assembly for a wind turbine blade is described, where the bulkhead is substantially formed from a flexible sheet material. In one aspect, the flexible sheet material can be attached to the larger assembly using a releasable connection, e.g. a zipped connection, to allow for relatively easy installation and removal, e.g. for repair or other service operations. At least a portion of the sheet material may be transparent, to allow for easy inspection of the interior of the wind turbine blade. In one aspect, the bulkhead assembly is arranged to couple to, or is formed integrally with, the root flange of a wind turbine blade. The use of such a flexible material to form the blade root end bulkhead allows for ease of handling and manufacturability over prior art systems.

16 Claims, 5 Drawing Sheets

(56) References Cited

U.S. PATENT DOCUMENTS

2008/0197638 A1\* 8/2008 Wobben ................... H02K 9/04
    290/55
2013/0164144 A1    6/2013 Bendel
2014/0377078 A1\* 12/2014 Bagepalli .............. F03D 1/0675
    416/241 R

FOREIGN PATENT DOCUMENTS

WO         2011/144974 A1     11/2011
WO     WO-2011144971 A1 \*  11/2011  ........... F03D 1/0675

\* cited by examiner

BULKHEAD ASSEMBLY FOR A WIND TURBINE BLADE

This is a National Phase Application filed under 35 U.S.C. 371 as a national stage of PCT/EP2015/053071, filed Feb. 13, 2015, an application claiming the benefit of European Application No. 14155186.1, filed Feb. 14, 2014, the content of each of which is hereby incorporated by reference in its entirety.

FIELD OF THE INVENTION

The present invention relates to a bulkhead assembly for a wind turbine blade, and a wind turbine blade having such a bulkhead assembly.

BACKGROUND OF THE INVENTION

Wind turbine blades are regularly provided with bulkheads at the root end of the blades. Such bulkheads are used to substantially seal the root end of the blade, and in some cases to provide a work platform at the blade root end.

The manufacturing and installation of such bulkheads can present issues during wind turbine blade manufacture, due to the transfer of stresses and strains between the walls of the wind turbine blade and the rigid bulkhead, which can result in the formation of fractures in the connection between the blade walls and the bulkhead.

EP2235364 discloses the use of a flexible flange to connect the rigid bulkhead to the internal blade walls, such that the flange acts to take up relative movement between the bulkhead and the blade walls and prevent the transferral of significant forces. However, such a system requires that an adequate sealing is provided between the flange and the blade walls and bulkhead. In addition, and repair or replacement of the flange or bulkhead requires a relatively significant service operation, as the entire blade may need to be removed from a wind turbine installation for access to the flange and bulkhead.

It is an object of the invention to provide a bulkhead solution for a wind turbine blade which allows for relatively flexible installation and use, and furthermore provides for relatively easy serviceability.

SUMMARY OF THE INVENTION

Accordingly, there is provided a bulkhead assembly for a wind turbine blade, the bulkhead assembly comprising:
 a flexible sheet material; and
 a mounting piece for mounting said flexible sheet material in a wind turbine blade as a bulkhead.

The use of a flexible sheet material as the bulkhead for a wind turbine blade results in a relatively light and inexpensive bulkhead construction, which can be relatively easily installed and removed without significantly affecting the structural characteristics of the wind turbine blade.

Preferably, said flexible sheet material comprises or is formed of a fabric material, a canvas material, a durable plastics material, or a tarpaulin.

Preferably, at least a portion of said flexible sheet material comprises a substantially transparent material.

As at least a portion of the sheet material is transparent, this allows operators to see into the interior of the wind turbine blade, and to easily detect if a service operation, such as debris removal from the interior of the wind turbine blade, is required.

In one aspect, said mounting piece comprises an adjustable collar arranged to fit inside a substantially circular root region of a wind turbine blade.

Preferably, the adjustable collar comprises a substantially circular collar, wherein the diameter of said collar can be adjusted.

Providing a mounting collar having an adjustable diameter allows for the bulkhead assembly to be relatively easily installed or removed from the root end of a wind turbine blade, as the collar diameter can be adjusted to provide for a snug fit with the substantially circular root end of a wind turbine blade.

Preferably, said collar comprises an adjustment mechanism to adjust the diameter of said collar to fit inside substantially circular root region of a wind turbine blade. Preferably, said adjustment mechanism comprises at least one of the following, a ratchet device, a biasing spring, etc.

As the adjustment mechanism can be controlled to vary the collar diameter, the bulkhead assembly can be adapted for use within wind turbine blades of different root diameters.

Alternatively, said mounting piece comprises at least one bracket, wherein said at least one bracket is arranged to couple with a root end flange of a wind turbine blade.

In one aspect, said at least one bracket is integrally formed as part of a root end flange of a wind turbine blade.

By providing the mounting piece as an integral part of a root flange of a blade, the installation of the bulkhead assembly can be relatively easily incorporated into the blade manufacturing process.

Preferably, said flexible sheet material is coupled to said mounting piece by at least one releasable connector, e.g. a zip fastener, a button fastener, a snap fastener, Velcro. In one aspect, the flexible sheet material is coupled to said mounting piece by at least one spring element, e.g. a hooked spring, coil spring, tension spring.

By providing a releasable connector system, the sheet bulkhead can be easily removed from the wind turbine blade if required, e.g. for access to the blade interior, or for repair or replacement of the sheet bulkhead itself. It will be understood that the mounting piece may be arranged to provide a seal against the interior surface of a wind turbine blade.

Preferably, said flexible sheet material comprises at least one access flap, wherein said at least one access flap can be opened to allow access through said flexible sheet material.

The use of such an access flap allows for relatively easy passage or access through the flexible sheet bulkhead, without removal of the entire bulkhead assembly from a blade. In one aspect, the access flap may comprise a fully or partially removable portion of said flexible sheet material, e.g. a circular door or window in the flexible sheet material. It will be understood that the access flap may be formed of a different material to the remainder of the flexible sheet material, e.g. a substantially transparent plastics material.

Preferably, said at least one access flap comprises at least one of the following: a zipped flap, a button flap, etc.

There is further provided a wind turbine blade having a tip end and a root end, the wind turbine blade further comprising a bulkhead assembly as described above, preferably located at the root end of the wind turbine blade. The bulkhead assembly may for instance be mounted to an interior part of the wind turbine blade.

Preferably, the wind turbine blade comprises a root flange provided at the root end of the wind turbine blade, wherein said bulkhead assembly is mounted to said root flange.

Additionally or alternatively, the wind turbine blade comprises at least one bracket defined on an internal surface of the wind turbine blade, wherein said at least one bracket is arranged to couple with a mounting piece of the bulkhead assembly.

Such a bracket may provide for easy alignment and retention of the mounting piece, e.g. an adjustable collar, within the interior of the blade. It will be understood that the at least one bracket may comprise at least one internal projection defined on the internal surface of the blade, said at least one internal projection used to retain a mounting piece of the bulkhead assembly. Preferably, said at least one bracket comprises a plurality of bracket members arranged along the internal circumference of the wind turbine blade.

There is further provided a wind turbine comprising at least one wind turbine blade as described.

DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings.

Figure 1:
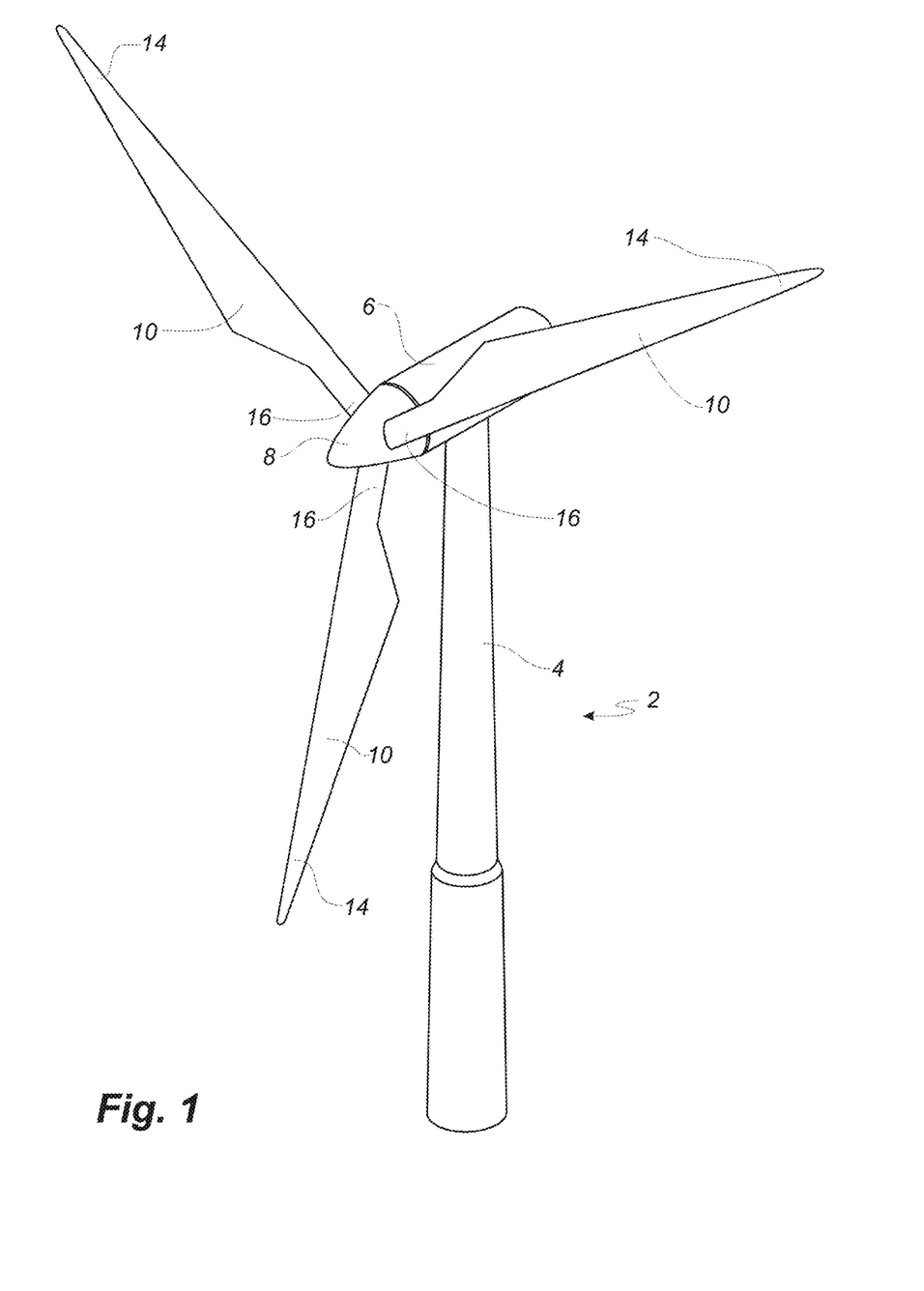
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
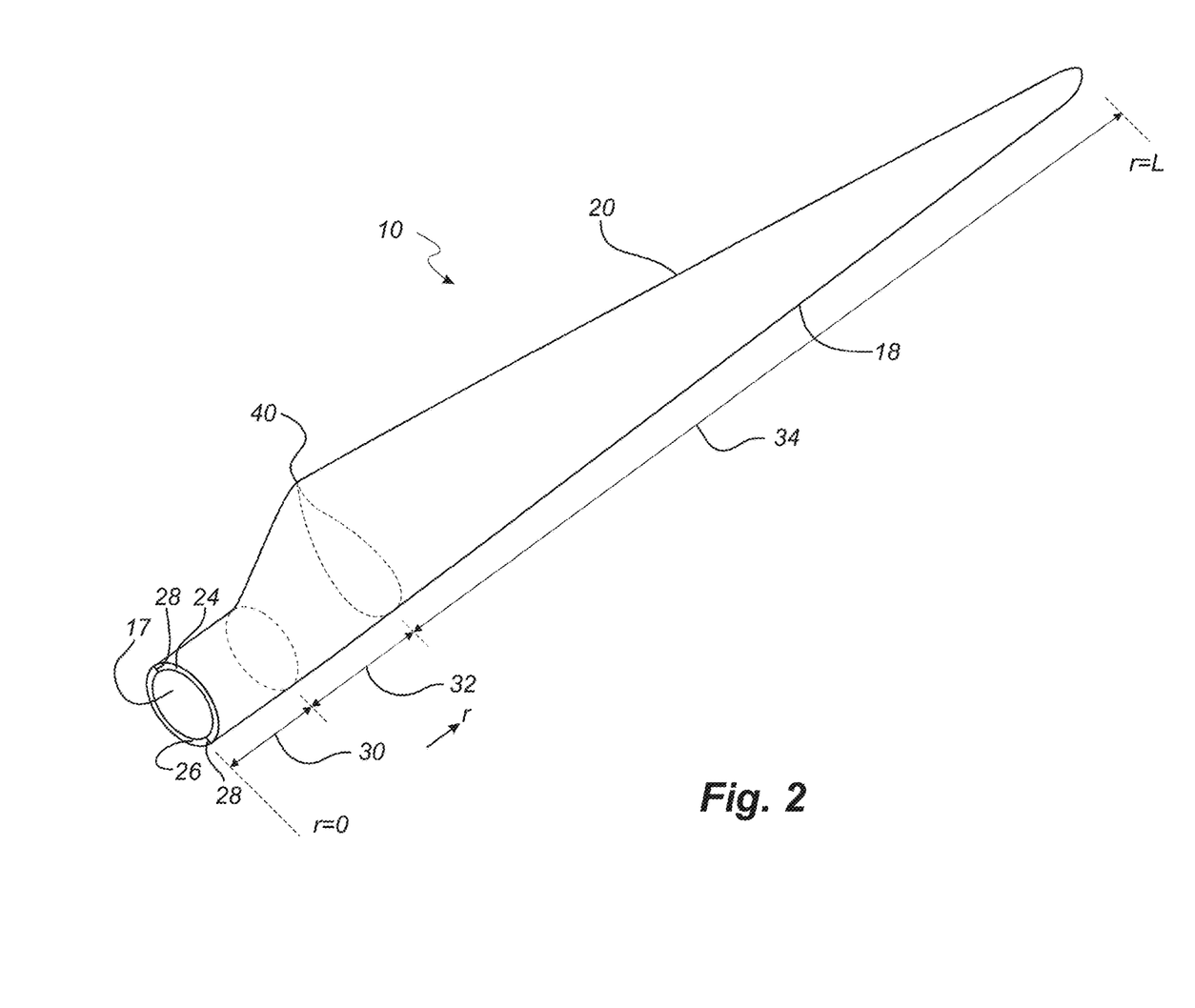
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
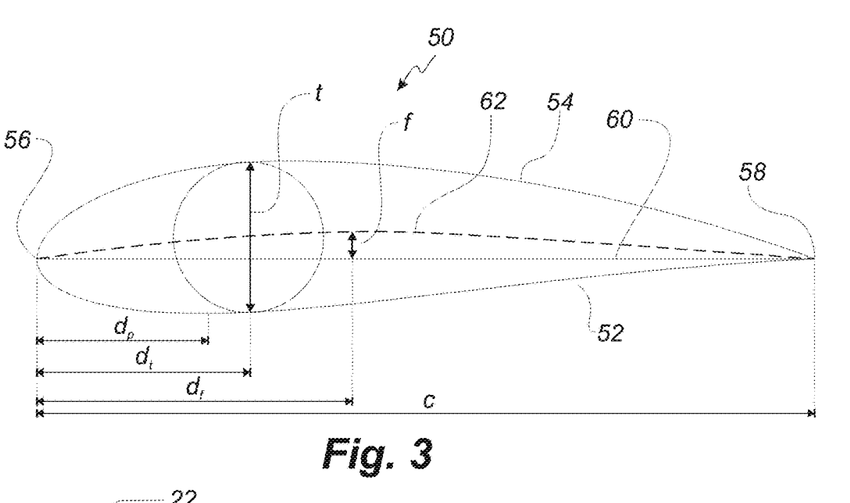
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
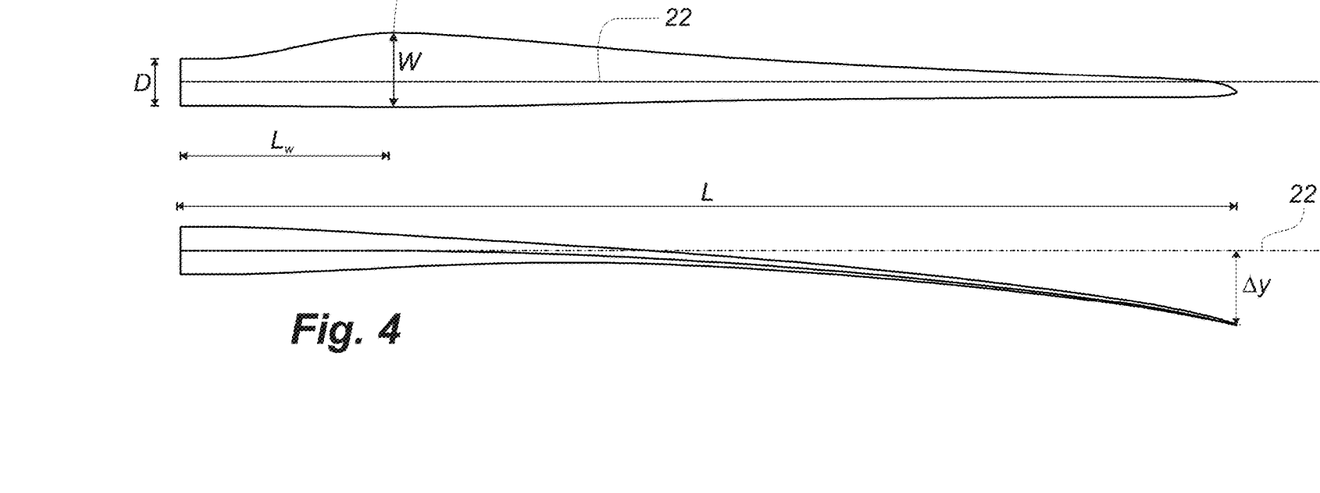
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

The wind turbine blade 10 may be provided with a root plate or root flange (not shown) at the root end 16 of the blade 10. The root plate generally comprises a metallic plate arranged at the diameter of the bolt circle of the blade root end 16.

Figure 5:
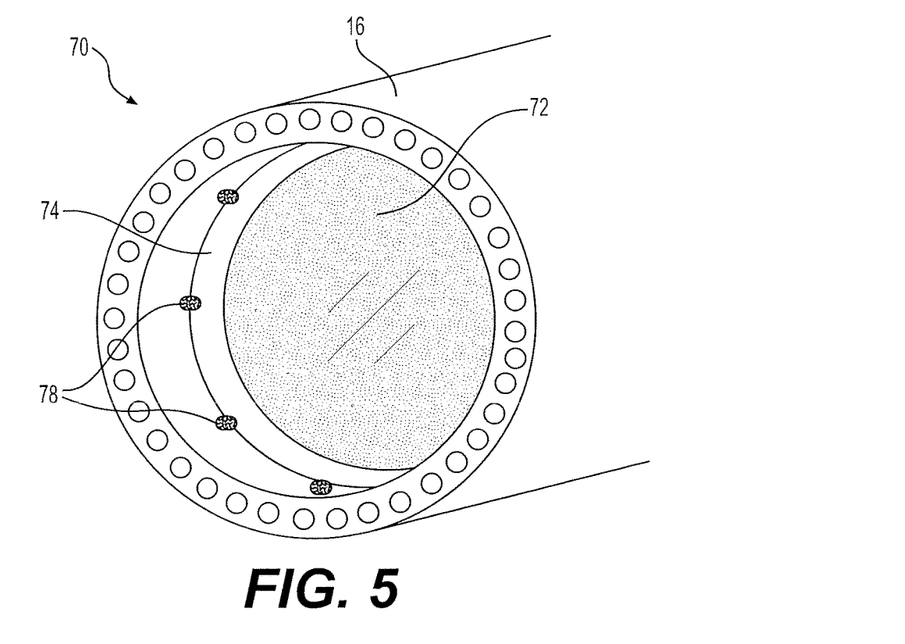
FIG. 5 illustrates a bulkhead assembly according to a first embodiment of the invention when installed in the root end of a wind turbine blade.

With reference to FIG. 5, an enlarged view of a bulkhead assembly 70 according to an embodiment of the invention is shown installed on a wind turbine blade 10. The assembly 70 is installed in the blade root end 16, preferably in an area of the root end 16 having a substantially circular cross-section.

The bulkhead assembly 70 comprises a relatively flexible sheet material 72 provided on a mounting piece 74 for mounting the assembly 70 within the interior of the wind turbine blade 10. As the bulkhead is substantially formed from a sheet material, accordingly the manufacturability and handling of the bulkhead assembly 70 can be greatly simplified.

The mounting piece 74 may be integrally formed with the internal walls of the blade 10, but preferably the mounting piece 74 is formed such that the bulkhead assembly 70 can be removably installed in the blade root end 16, to provide for ease of repair or replacement of the assembly 70. In the embodiment shown in FIG. 5, the mounting piece 74 comprises a substantially circular collar piece which can be fitted to the interior of the blade root 16, where the mounting piece 74 is connected substantially about the circumference of a circular-shaped sheet material 72.

Figure 6A:
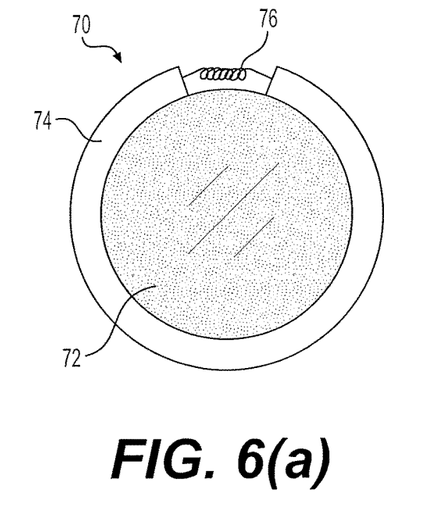
FIG. 6 illustrates two possible implementations of the embodiment of FIG. 5.

Preferably, the bulkhead assembly 70 is removably positioned within the blade root 16. The mounting piece 74 may be formed of a resilient material such that the assembly 70 can be installed in the root end 16 with a snug fit to the internal walls of the blade 10. With reference to FIG. 6(a), the mounting piece 74 comprises at least one adjustment device 76 which allows for the adjustment of the diameter of the mounting piece 74.

In the embodiment of FIG. 6(a), the adjustment device is a biasing spring, which allows the diameter of the mounting piece 74 to be reduced by compression of the spring, e.g. during an installation or removal of the assembly 70 on a wind turbine blade 10. By releasing the spring 76 from compression, the mounting piece 74 is biased towards an at rest diameter which may be selected to be greater than or substantially equivalent to the internal diameter of the wind turbine blade root end 16. Accordingly, the mounting piece 74 and the larger bulkhead assembly 70 are retained within the root end 16 of the blade 10, by the mounting piece 74 bearing against the internal walls of the blade 10.

Additionally or alternatively, the at least one adjustment device may comprise any suitable mechanism to control the diameter of the mounting piece 74, to allow for a snug fit within the interior of a wind turbine blade 10, e.g. a ratchet mechanism, rack and pinion mechanism, set screws, etc.

As the assembly 70 can be relatively easily adapted for use within the root ends of blades having different internal diameters, the bulkhead assembly of the invention can be implemented across a range of different wind turbine blade designs, in comparison with the relatively rigid prior art systems, which require different bulkhead designs for each different blade root design.

Additional bracket elements 78 are provided on the interior walls of the blade root end 16 to provide additional support and/or retention of the bulkhead assembly 70 in the interior of the blade 10. The bracket elements 78 may be arranged to at least partially define a raceway or channel on the interior surface of the blade 10, wherein the periphery of the mounting piece 74 of the assembly 70 is at least partially received within said channel. It will be understood that bracket elements may be provided at the root-end-facing side of the assembly 70 (as shown in FIG. 5) and at the tip-end-facing side of the assembly (not shown). Accordingly, the bulkhead assembly 70 is retained in position within the root end 16 of the blade 10, and prevented from movement along the longitudinal direction of the blade 10.

While a plurality of individual bracket elements 78 are shown in the embodiment of FIG. 5, it will be understood that the bracket elements may comprise a single root-side bracket and a single tip-side bracket arranged to define a collar or lip around substantially the entire internal circumference of the blade walls on opposed sides of the mounting piece 74.

The bracket elements 78 may be formed integrally with the walls of the wind turbine blade 10, e.g. during a moulding operation. Additionally or alternatively, the bracket elements 78 may be attached to the internal walls of the wind turbine blade 10 at the location to receive the bulkhead assembly 70, e.g. through adhesive bonding, bolting, riveting, etc.

The flexible sheet member 72 of the bulkhead assembly 70 is preferably formed of a material such as a fabric material, a canvas material, a durable plastics material, or a tarpaulin, preferably a waterproof material. Preferably, at least a portion of the flexible sheet member 72 is formed of a transparent material, allowing for inspection of the interior of the wind turbine blade 10 when the bulkhead assembly 70 is installed. It will be understood that the entire sheet member 72 may be transparent, or only a portion of the flexible sheet material 72 is transparent, forming an inspection window.

Figure 6B:
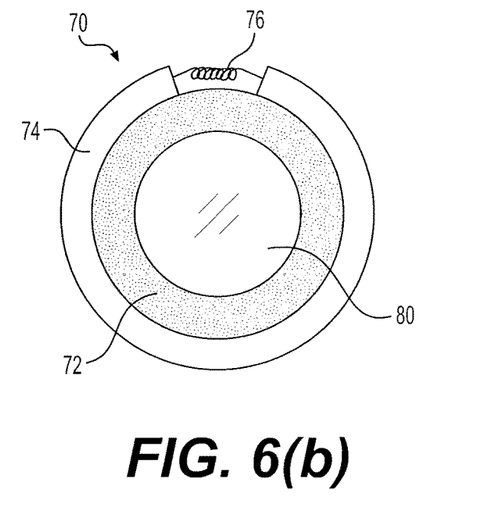

With reference to the embodiment shown in FIG. 6(b), the flexible sheet member 72 may comprise an access flap 80 provided in the sheet member 72. The access flap 80 is provided in the form of a door or panel which can be opened to provide access through the flexible sheet member 72 to the other side of the bulkhead assembly 70. The access flap 80 may be connected to the greater flexible sheet member 72 using any suitable connection system, e.g. a zip connector, a button or snap-fit connector system, Velcro, etc. In the embodiment shown in FIG. 6(b), the access flap 80 is provided from a transparent material, while the remainder of the flexible sheet material 72 is provided as an opaque material, allowing for the access flap 80 to also serve as an inspection window.

The flexible sheet material 72 is preferably removably connected to the mounting piece 74, about at least a portion of the periphery of the flexible sheet material 72, preferably about the entire periphery. Such a connection may be established using any suitable removable connection system, e.g. a zipped connection, a button connector, a snap-fit connector, a magnetic connector, etc. The flexible sheet material may be tied onto suitable lugs or hooked flanges. In one aspect, the flexible sheet material 72 can be coupled to the mounting piece 74 by at least one spring element, e.g. a hooked spring, coil spring, tension spring, etc., similar to a trampoline construction. By providing for a removable flexible sheet material 72, accordingly the material may be easily removed for repair or internal access, without requiring removal of the entire bulkhead assembly 70.

While the above embodiment illustrates the mounting piece 74 provided as a separate element, it will be understood that the mounting piece may be provided as an integral part of a wind turbine blade, e.g. as connector lugs or flanges defined on the internal walls of a wind turbine blade during a manufacturing or assembly operation.

Figure 7:
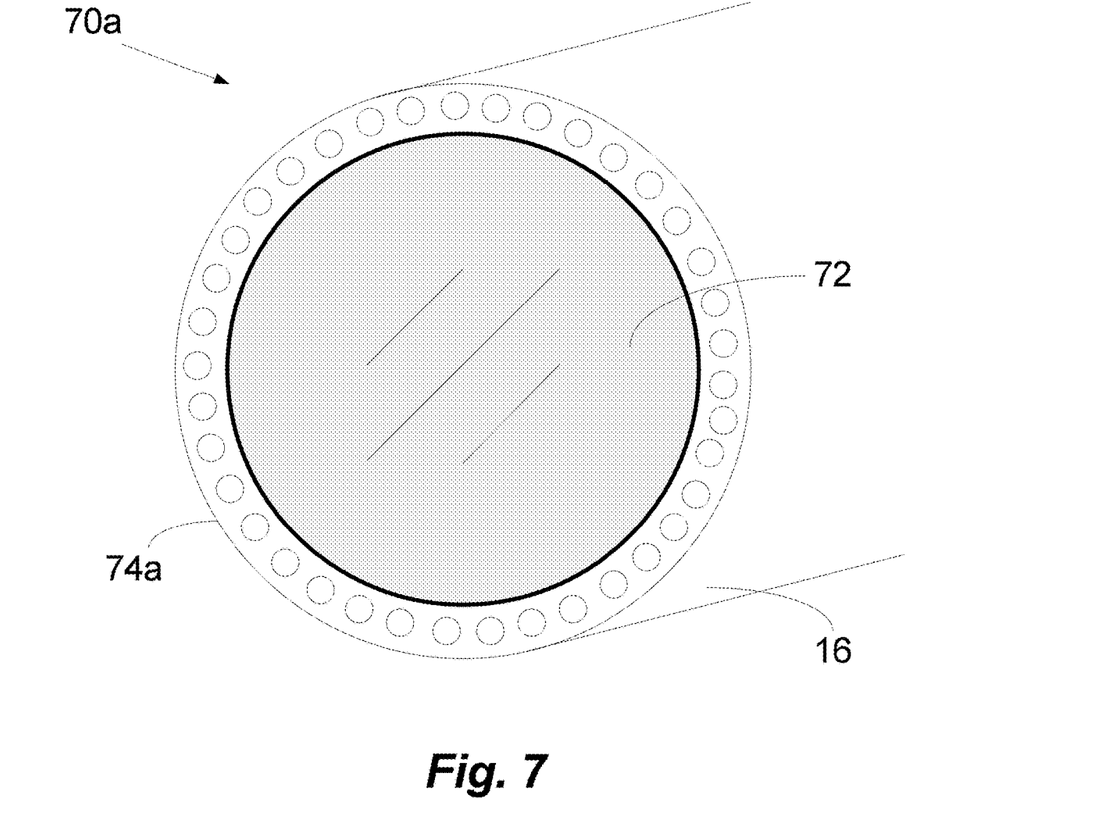
FIG. 7 illustrates a bulkhead assembly according to a second embodiment of the invention when installed at the root end of a wind turbine blade.

With reference to FIG. 7, a further embodiment of a bulkhead assembly 70a according to an aspect of the invention is illustrated. In this embodiment, the mounting piece 74a of the assembly 70a is formed integrally with the root plate or root flange of a wind turbine blade 10, such that the flexible sheet member 72 can be attached directly to the root plate or root flange of the blade 10. Preferably, the flexible sheet material is removably attached to the root flange 74a, e.g. using a zipper connection, such that the flexible sheet material 72 can be relatively easily installed on the blade 10 after assembly of the different blade components including the root flange 74a.

In an alternative aspect, the mounting piece of the bulkhead assembly may comprise bracket members (not shown) which are arranged to couple to, or are integrally formed with, the root flange of the blade 10. The bracket members may be arranged to extend a defined distance into the interior of the wind turbine blade root end 16, where the flexible sheet member 72 can be subsequently attached to the bracket members for retention in the blade 10.

It will be understood that the features of the different variations of the embodiments of FIGS. 5 and 6 may equally be implemented in the embodiment of FIG. 7 mutatis mutandis.

While the bulkhead assembly 70,70a shown in the above embodiments has a substantially circular shape, it will be understood that the assembly may have any suitable shape, to fit with the corresponding shape of a wind turbine root end, e.g. square, oval, etc.

Providing a bulkhead assembly for a wind turbine blade, wherein the bulkhead is substantially formed from a flexible sheet material provides for improved handling and manufacturability compared to prior art systems. The bulkhead assembly may further provide for improved ease of installation and service, while simultaneously minimising the structural demands on the wind turbine blade for the bulkhead system.

The invention is not limited to the embodiments described herein, and may be modified or adapted without departing from the scope of the present invention.

The invention claimed is:

1. A bulkhead assembly (70, 70a) for a wind turbine blade (10), the bulkhead assembly (70, 70a) comprising:
    a flexible sheet material (72); and
    a mounting piece (74), wherein the flexible sheet material (72) is mounted on the mounting piece (74) within a wind turbine blade (10), the flexible sheet material (72) forming a bulkhead thereof.

2. The bulkhead assembly of claim 1, wherein said flexible sheet material (72) is formed of a fabric material, a canvas material, a durable plastics material, or a tarpaulin.

3. The bulkhead assembly of claim 1, wherein at least a portion of said flexible sheet material comprises a transparent material.

4. The bulkhead assembly of claim 1, wherein said mounting piece comprises an adjustable collar arranged to fit inside a circular root region of a wind turbine blade.

5. The bulkhead assembly of claim 4, wherein the adjustable collar comprises a circular collar, wherein the diameter of said collar can be adjusted.

6. The bulkhead assembly of claim 4, wherein said collar comprises an adjustment mechanism to adjust the diameter of said collar to fit inside the circular root region of the wind turbine blade.

7. The bulkhead assembly of claim 1, wherein said mounting piece comprises at least one bracket, wherein said at least one bracket is arranged to couple with a root end flange of a wind turbine blade.

8. The bulkhead assembly of claim 1, wherein said mounting piece is integrally formed as part of a root end flange of a wind turbine blade.

9. The bulkhead assembly of claim 1, wherein said flexible sheet material is coupled to said mounting piece by at least one releasable connector.

10. The bulkhead assembly of claim 1, wherein said flexible sheet material comprises at least one access flap, wherein said at least one access flap can be opened to allow access through said flexible sheet material.

11. The bulkhead assembly of claim 10, wherein said at least one access flap comprises at least one of the following: a zipped flap, a button flap, a snap-fit flap, and a hook-and-loop fastened flap.

12. A wind turbine blade (10) having a tip end (14) and a root end (16), the wind turbine blade further comprising a bulkhead assembly (70, 70a) as claimed in claim 1.

13. The wind turbine blade of claim 12, wherein the wind turbine blade comprises a root flange (74a) provided at the root end (16) of the wind turbine blade (10), wherein said bulkhead assembly (70a) is mounted to or formed integrally with said root flange.

14. The wind turbine blade of claim 12, wherein the wind turbine blade comprises at least one bracket (78) provided on an internal surface of the wind turbine blade, wherein said at least one bracket is arranged to couple with the mounting piece of the bulkhead assembly.

15. A wind turbine comprising at least one wind turbine blade as claimed in claim 12.

16. The bulkhead assembly of claim 9, wherein the at least one releasable connector is selected from the group consisting of a zip fastener, a button fastener, a snap fastener, and a hook-and-loop fastener.

* * * * *